Figure 1:
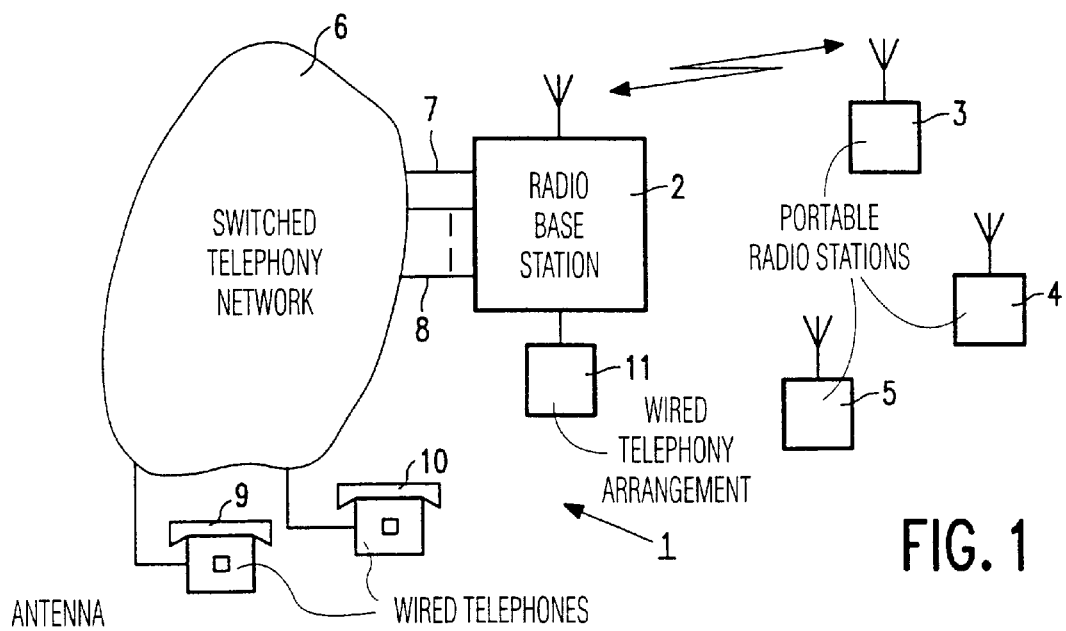

United States Patent [19]
Arends et al.

[11] Patent Number: 5,909,432
[45] Date of Patent: Jun. 1, 1999

[54] DIGITAL CORDLESS TELEPHONY SYSTEM, A RADIO BASE STATION, AND A COMBINATION OF A RADIO BASE STATION AND A CORDLESS HANDSET

[75] Inventors: Marc V. Arends; Antonius J. P. Bogers, both of Eindhoven, Netherlands; Guido K. Willi, Cham, Switzerland

[73] Assignee: U.S. Philips Corporation, New York, N.Y.

[21] Appl. No.: 08/758,652

[22] Filed: Dec. 2, 1996

[30]   Foreign Application Priority Data

Dec. 1, 1995 [EP]  European Pat. Off. .............. 95203311

[51] Int. Cl.$^6$ ..................................................... H04Q 7/00
[52] U.S. Cl. ........................... 370/261; 370/328; 370/338
[58] Field of Search .................................... 370/328, 329, 370/330, 331, 336, 337, 338, 340, 341, 343, 344, 345, 347, 259, 260, 261, 263, 264, 270; 375/242, 244; 379/202, 204, 205, 206

[56]    References Cited

U.S. PATENT DOCUMENTS

| | | | |
|---|---|---|---|
| 5,191,593 | 3/1993 | McDonald et al. ...................... | 375/200 |
| 5,278,866 | 1/1994 | Nomami .................................. | 375/227 |
| 5,416,778 | 5/1995 | Chan et al. .............................. | 370/330 |
| 5,467,372 | 11/1995 | Nishitani .................................. | 375/244 |
| 5,490,183 | 2/1996 | Nishimura et al. ...................... | 375/377 |
| 5,493,693 | 2/1996 | Tanaka et al. ........................... | 455/403 |
| 5,604,740 | 2/1997 | Pinault et al. ........................... | 370/463 |
| 5,734,678 | 3/1998 | Paneth et al. ............................ | 375/240 |

FOREIGN PATENT DOCUMENTS

WO9208328  5/1992  WIPO ............................ H04Q 11/04

OTHER PUBLICATIONS

"User Manual" ABC DSP PCD5097 FP Release 2.0, Philips Semiconductors, pp. 1–51, 31 Jul. 1995.

Handbook—"Cordless Telecommunications in Europe", By H.W. Tuttlebee, Springer Verlag, 1990, Appendix 3, pp. 273–284.

Siemens Spec. ISDN Oriented Modular Interface Specification, Rev. 2.2., IOM 2nd Generation, Siemens, AG, Sep. 1988, Par. 1 to Par. 6, 39 Pages.

*Primary Examiner*—Chi H. Pham
*Assistant Examiner*—Kwang B. Yao

[57]    ABSTRACT

A digital cordless telephony system comprises a radio base station and a plurality of portable radio stations. The radio base station comprises a single digital signal processor for performing standard radio base station functions, and further for supporting all kinds of connections between different parties such as portable parties, network parties, and local base station parties. The single digital signal processor executes party profiles corresponding to a desired connection configuration.

15 Claims, 5 Drawing Sheets

DIGITAL CORDLESS TELEPHONY SYSTEM, A RADIO BASE STATION, AND A COMBINATION OF A RADIO BASE STATION AND A CORDLESS HANDSET

The present invention relates to a digital cordless telephony system comprising a radio base station and a plurality of portable radio stations for communicating with the radio base station, in which system the radio base station is arranged to be coupled to a switched telephony network and comprises a multi-channel radio front-end, a channel controller, a buffer memory for buffering receive and transmit data, and a digital signal processor for data format converting the receive and transmit data, the buffer being coupled to the channel controller and the digital signal processor. Such a system can be a FD/TDMA system, an FDMA system, a CDMA system, or any other digital cordless telephony system.

The present invention further relates to a radio base station for use in such a system, and to a combination of a radio base station and a cordless handset.

A digital cordless telephony system of the above kind is known from the User Manual "ABC DSP PCD5097 FP Release 2.0", Philips Semiconductors, pp. 1–51, Jul. 31, 1995. Described is DSP (Digital Signal Processor) speech flow in a DECT (Digital European Cordless Telecommunications) FD/TDMA (Frequency Division/Time Division Multiple Access) cordless telephony base station. At page 9, in FIG. 1 of this manual, a block diagram of the base station is presented showing a receive path and a transmit path from an antenna to an A/B-line connection to a switched telephone network including so-called burst mode logic as an FD/TDMA channel controller for controlling data burst to and from timeslots on an air interface, a buffer memory for buffering receive and transmit data, a digital signal processor, and a codec for encoding an analog signal to 16-bit linear PCM (Pulse Code Modulation) data at 32 kHz, and for decoding 16-bit linear PCM data at 32 kHz to an analog signal. At page 10, in FIG. 2 of this manual, the functionality of the DSP and the codec are shown in more detail. The DSP converts received ADPCM samples at a rate of 80 samples per 10 msec, a DECT frame, and stored in the buffer memory to 16-bit linear PCM data, and performs other functions like received volume control, receive filtering, echo suppression, side tone control, DTMF-tone generation, transmit filtering, or the like. Such a base station is suitable to carry out standard DECT base station functions, i.e. is suitable to connect one out of a plurality of portable radio stations to an analog A/B-line, but does not support other functionality.

It is an object of the present invention to provide a digital cordless telephony system comprising a simple and low cost multi-functional base station that supports portable calls, calls to local base station devices, and conference calls, or the like.

To this end the digital cordless telephone system according to the present invention is characterized in that the radio base station is arranged to operate in different connection modes for connecting different parties to each other including a selection from connections comprising a connection of a portable radio station as a first party to the telephone network as a second party, a connection of the first party to a wired telephony arrangement as a third party, and a connection of at least three of the parties in a conference call, and that the digital signal processor is programmed to switch from one connection mode to another connection mode at an external stimulus signal, the digital signal processor further being programmed to support digital signal processing functionalities of the parties. Herewith, a large integration of function can be achieved. The channel controller, the DSP, a codec, and control logic can be integrated on a single chip while still a very flexible system is achieved. As compared to expensive and from a hardware and software point of view complicated conventional PABXs (Private Automatic Branch Exchanges) with functionality as support of conference calls for instance, the radio base station according to the present invention can be considered as a very low cost and very simple miniature PABX, extremely useful for small business or home applications.

In an embodiment of a digital cordless telephony system according to the present invention, the radio system is a frequency and time division multiple access system in which at an air interface the portable radio stations are arranged to communicate with the radio base station in timeslots of a radio carrier, and that the channel controller is arranged to switch data bursts to and from the buffer memory in a timeslot.

In an embodiment of a digital cordless telephony system according to the present invention, at a network side the digital signal processor is arranged to exchange data according to standard ISDN-interface so as to support at least two outgoing lines, the digital signal processor further being arranged to an arbitrary internal data channel to the lines. Herewith, the radio base station can easily be coupled to at least two outgoing lines of a digital network like an ISDN (Integrated Services Digital Network), or of an analog network, either directly via a standard $S_0$-controller, or via an external DSP supporting echo cancellation and conversion of digital signals to analog signals, and vice versa.

In an embodiment of a digital cordless telephony system according to the present invention, a functionality of the first party includes ADPCM-decoding and ADPCM-encoding means for respective decoding of 4-bit ADPCM data received from the air interface to 16-bit linear PCM data, and encoding of 16-bit linear PCM data to 4-bit ADPCM data to be transmitted via the air interface. Herewith, at the side of the air interface, the system complies with the DECT Standard.

In an embodiment of a digital cordless telephony system according to the present invention, a functionality of the second party includes A-law or $\mu$-law decoding and A-law or $\mu$-law encoding means for respective decoding of 8-bit A-law or $\mu$-law PCM data from the network to 16-bit linear PCM data, and encoding 16-bit linear PCM data to 8-bit A-law or $\mu$-law PCM data to be transmitted to the network. Herewith, 64 kbit/s signals are obtained using an industrial interface like a so-called IOM™-ISDN interface.

In an embodiment of a digital cordless telephony system according to the present invention, the digital signal processor is programmed to connect parties on the basis of buffer pointers for pointing at appropriate data buffer for data exchange between parties. Herewith, a simple mechanism is provided for a flexible coupling of parties.

In an embodiment of digital cordless telephony system according to the present invention, the radio base station comprises a microcontroller for controlling the digital signal processor and for loading mode control parameters in the digital signal processor. Herewith, the DSP is set in a desired mode. In principle, when still more advanced DSPs will become available, the functionality of the microcontroller can be integrated with the functionality of the DSP. Then, no separate microcontroller will be needed.

In an embodiment of the digital cordless telephony system according to the present invention, the network is an analog network, and the radio base station comprises a further digital signal processor which is programmed to support echo cancelling of at least two network lines and to support respective decoding of A-law PCM data to an analog signal to be transmitted to the network, and encoding of an analog signal to A-law PCM data received from the network. Herewith, the radio base station is fully adapted to the requirements of an analog network, while still with minimum hardware to support more than one outgoing line.

In an extremely simple embodiment of a digital cordless telephony system according to the present invention, the digital signal processor supports two first parties or portables, two outgoing lines, and one local device, e.g. a handsfree arrangement in the form of a microphone and a loudspeaker coupled to the DSP. Herewith, a very simple and cheap home-PABX is obtained. Also, a digital answering device or any other suitable device can be coupled to the IOM™-interface. Herewith, any party can communicate with the digital answering device or the other device. The functionality of the digital answering device can advantageously be integrated in the digital signal processor.

Figure 2:
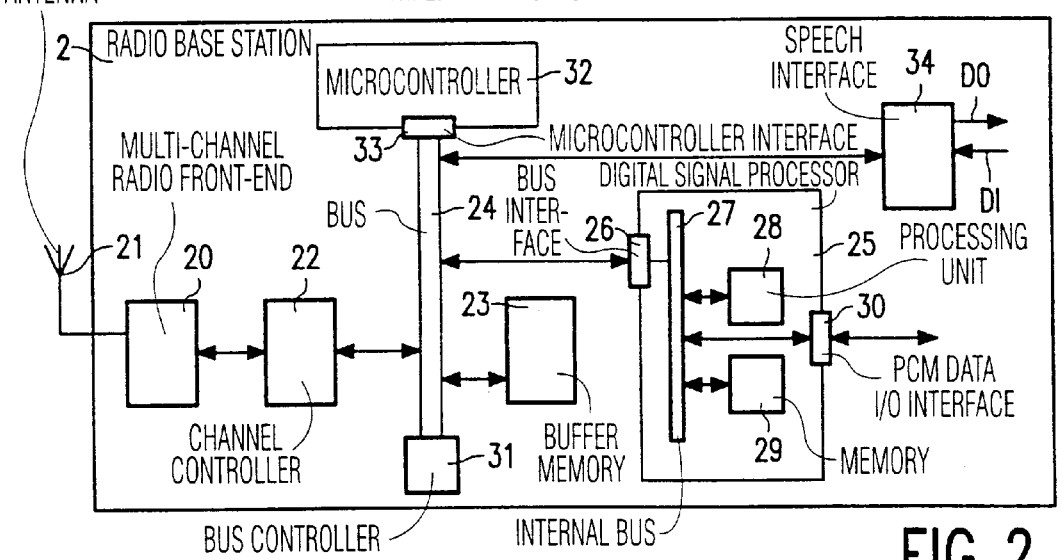
Figure 3:
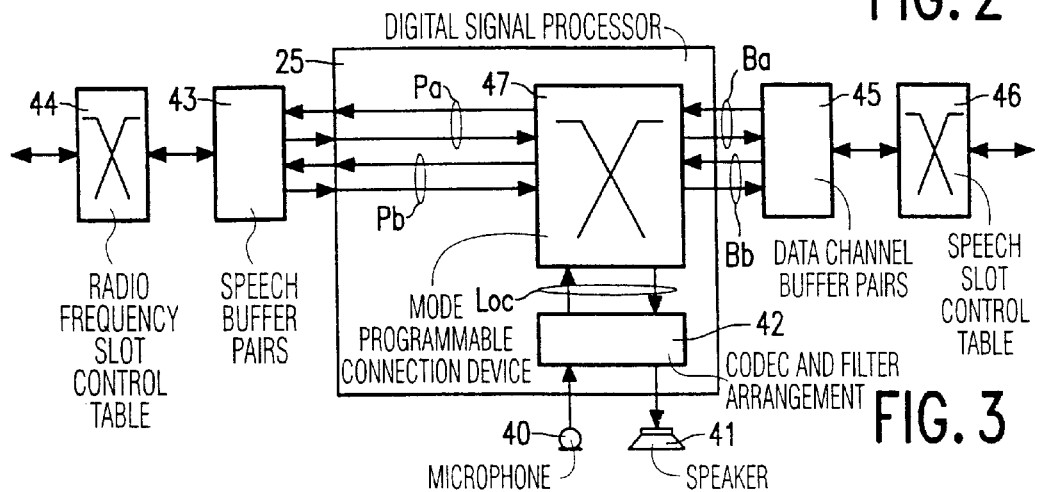
Figure 4:
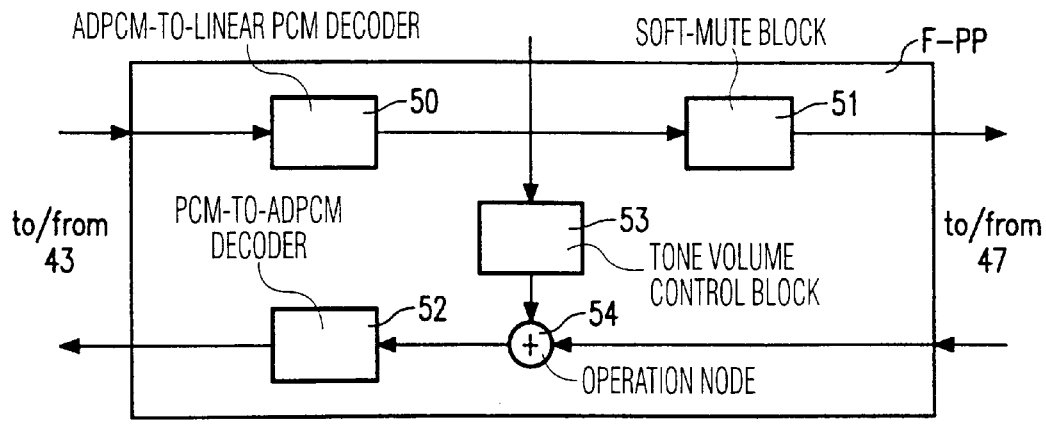
Figure 5:
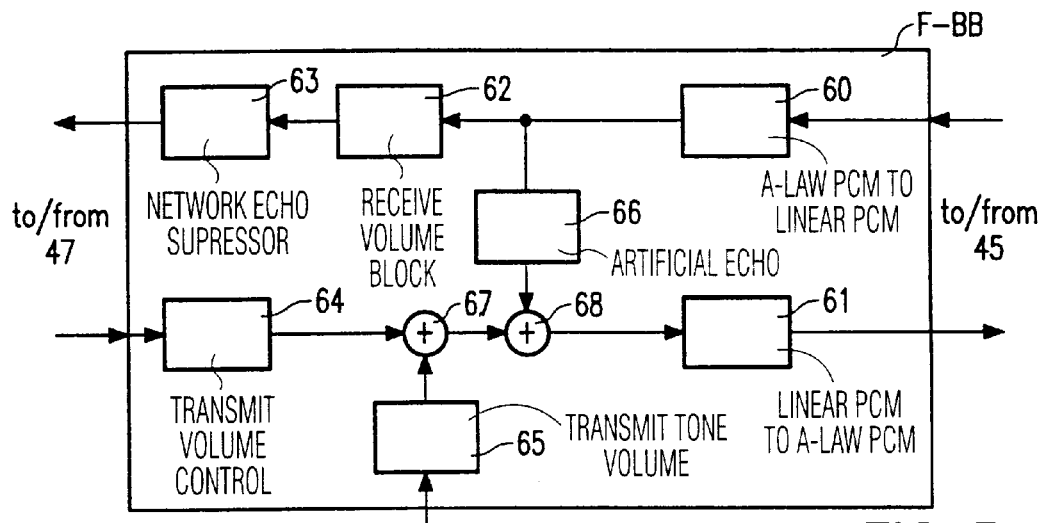
Figure 6:
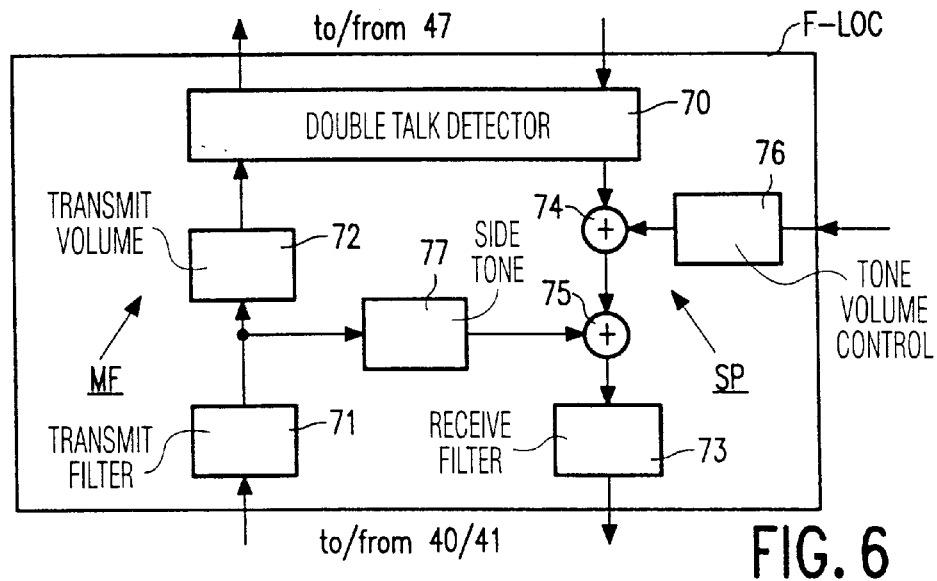
Figure 7:
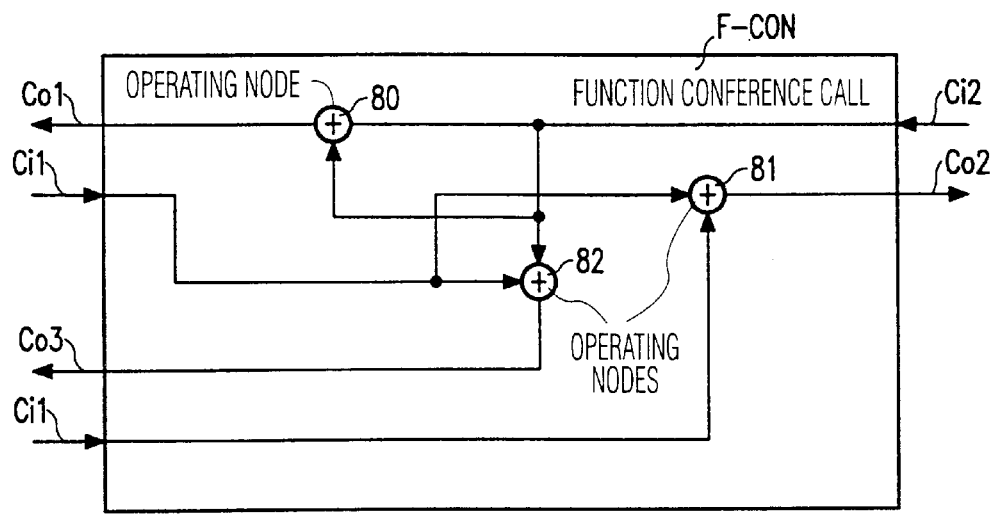
Figure 8:
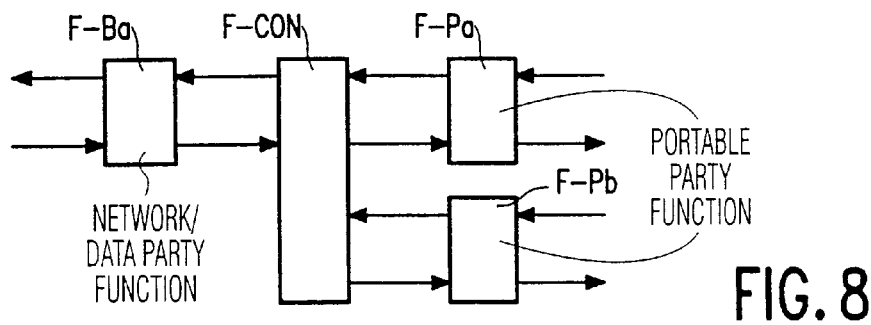
Figure 9:
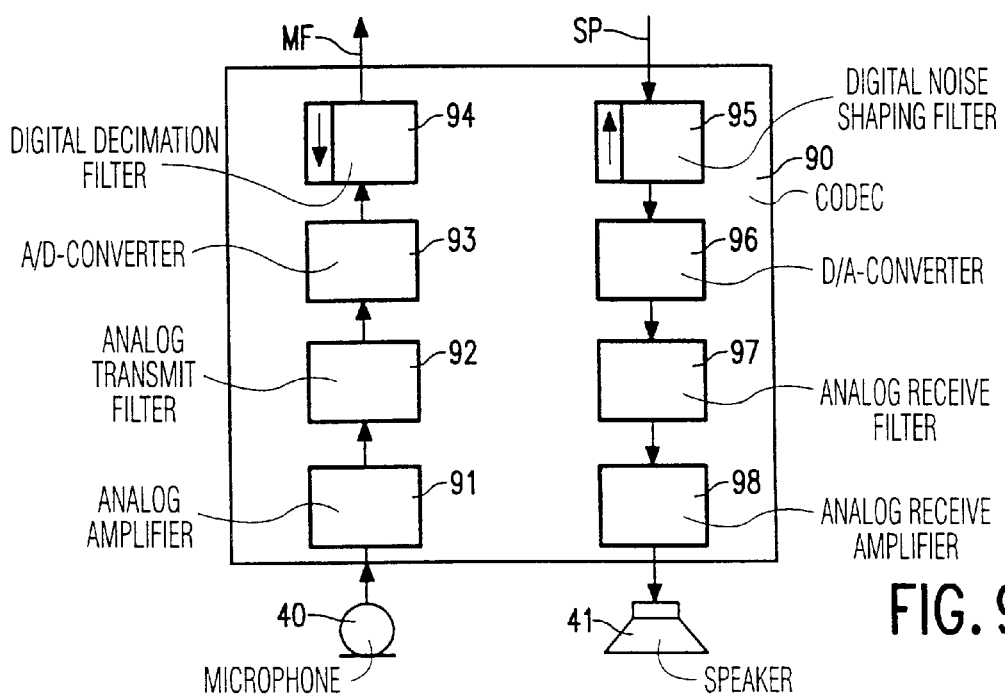
Figures 10, 12:
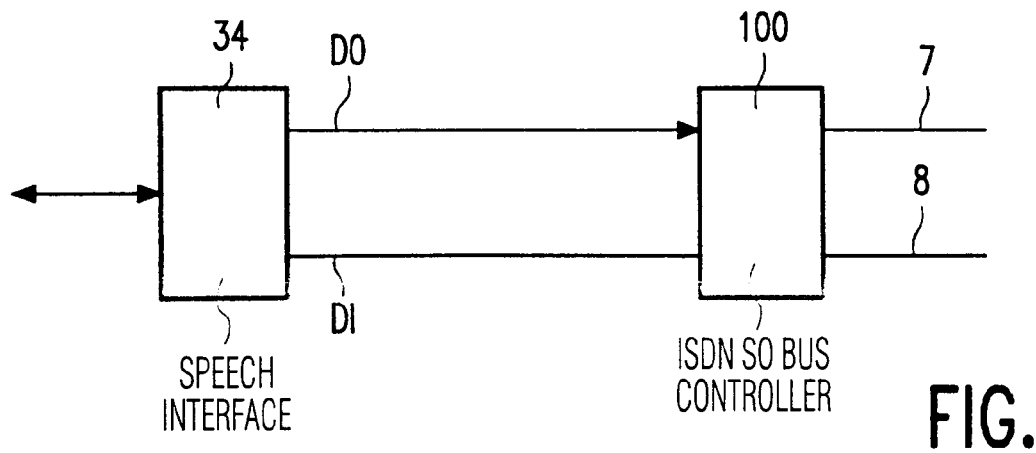
Figure 11:
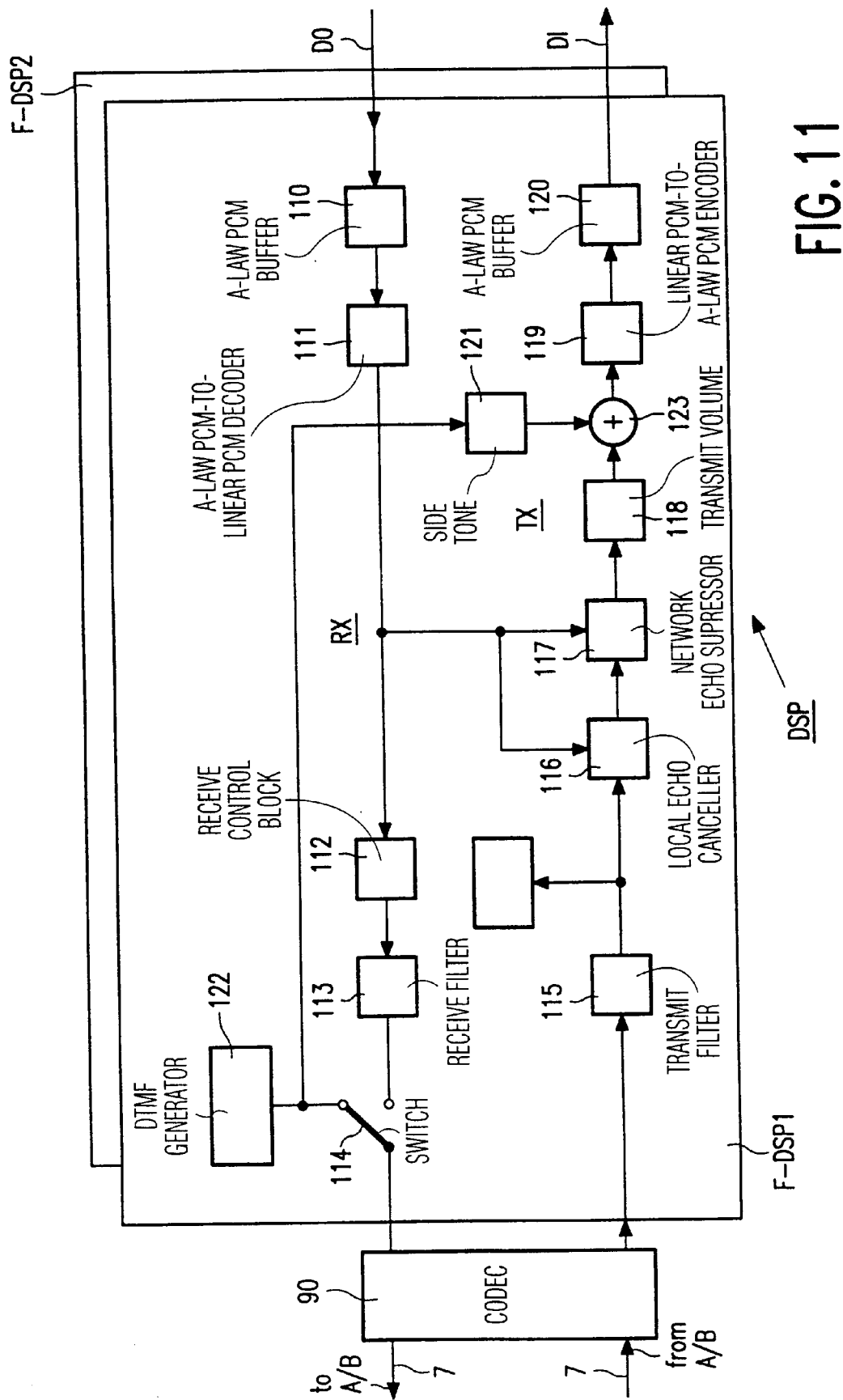

The present invention will now be described, by way of example, with reference to the accompanying drawings, wherein FIG. 1 schematically shows a block diagram of a digital cordless telephony system according to the present invention, FIG. 2 shows a radio base station according to the present invention, FIG. 3 shows mode switching in a radio base station according to the present invention, FIG. 4 shows a functional diagram of a first party in a digital signal processor in a radio base station according to the present invention, FIG. 5 shows a functional diagram of a second party in a digital signal processor in a radio base station according to the present invention, FIG. 6 shows a functional diagram of a third party in a digital signal processor in a radio base station according to the present invention, FIG. 7 shows a functional diagram for setting up a conference call in a digital signal processor according to the present invention, FIG. 8 shows an example of a connection in a digital signal processor according to the present invention of two portable radio stations and a switched network telephone station in a conference call, FIG. 9 shows a codec for use in a local mode in a radio base station according to the present invention, FIG. 10 shows coupling of the radio base station to two outgoing lines of a digital telephony network such as an ISDN network, FIG. 11 shows coupling of the radio base station to two outgoing lines of an analog telephony network, and FIG. 12 shows a parameter table for a digital signal processor in a radio base station according to the present invention.

Throughout the figures the same reference numerals are used for the same features.

FIG. 1 schematically shows a block diagram of a digital cordless telephony system 1 according to the present invention. By way of example a DECT (Digital European Cordless Telecommunications) system will be described, but the system can be any other digital cordless telephony system. For a more detailed description of DECT referred is to the handbook "Cordless Telecommunications in Europe", H. W. Tuttlebee, Springer Verlag, 1990, Appendix 3, pp. 273–284.

On page 278 of this handbook a multicarrier TDMA (Time Division Multiple Access) TDD (Time Division Duplex) DECT frame structure of twelve timeslots in uplink and downlink direction on the air interface is shown, such a frame structure being well-known in the art. The system 1 comprises a DECT radio base station 2, and a plurality of portable DECT radio stations 3, 4 and 5 for communicating with the radio base station 2, a portable radio station being a first party in a connection according to the present invention. The radio base station 2 is coupled to a switched telephony network 6 via at least two outgoing lines 7 and 8. The network 6 can be a public or a private network. The network 6 can be an analog or a digital telephony network. Wired telephones 9 and 10 of fixed network subscribers are coupled to the switched network 6. The radio base station 2 is locally coupled to a wired telephony arrangement 11 that can simply be a telephone receiver or a handsfree arrangement.

FIG. 2 in more detail shows the radio base station 2 according to the present invention. The radio base station 2 comprises a multi-channel radio front-end 20 at one end being coupled to an antenna 21 and at another end being coupled to a channel controller 22, in the given example a so-called DECT burst mode controller as disclosed in FIG. 1 on page 9 of said PCD5093 FP user manual of Jul. 31, 1995, 'Burst Mode Logic' (BML). Such a channel controller is known in the art per se. One of the functions of the channel controller 22 is to exchange 32 kbit/s ADPCM (Adaptive Differential Pulse Code Modulation) data bursts between a radio front end's channel resource, i.e. a time slot on a given carrier, and a buffer memory 23. To this end, both the channel controller 22 and the buffer memory 23 are coupled to a bus 24. The radio base station 2 further comprises a digital signal processor 25 that is coupled to the bus 24 via a bus interface 26. The digital signal processor 25 comprises an internal bus 27 that is coupled to the bus interface 26, and further to a processing unit 28 and a memory 29 within the digital signal processor 25. The memory 29 that can be RAM memory and/or ROM memory can be loaded with software according to the present invention, either by means of so-called downloading or by means of so-called hard-wired software. In the latter case, the manufacturing process used to make the DSP 25 can be SACMOS (Self Aligned CMOS), or any other suitable process. The internal bus 27 is further coupled to a PCM data input/output interface 30 for providing 16-bit linear PCM input/output data at 32 kHz, i.e. a bit rate of 512 kbit/s outside the DSP 25. The radio base station 2 further comprises a bus controller 31 for controlling the bus 24, and a suitably programmed microcontroller 32 with RAM, ROM and I/O-ports that is coupled to the bus 24 via a microcontroller interface 33. The microcontroller, that can be a 8051-type microcontroller, or the like, is arranged to control the digital signal processor 25 and to download mode control parameters in the digital signal processor 25 to put the DSP 25 in a desired connection or program mode. The radio base station 2 further comprises a speech interface 34 that is coupled to the external bus 24. The speech interface 24 provides so-called IOM™-2 A-law PCM signals, i.e. in applying an IOM™-2 industrial standard, time division mode 64 kbit/s PCM input and output signals D0 and D1 are provided, together with a number of control signals (not shown in detail). Such an IOM™-2 interface is described in a Siemens Spec. "ISDN Oriented Modular Interface Specification", Rev. 2.2, IOM™ 2$^{nd}$ Generation, Siemens AG, 9/88, par. 1 to par. 6, 39 pages.

FIG. 3 shows mode switching in the radio base station 2 according to the present invention for three kinds of parties, first parties Pa and Pb being portable parties, second parties Ba and Bb being data channel parties, and a third party Loc being a local party. The local party can be a telephone receiver consisting of a microphone 40 and a speaker 41, or a similar handsfree arrangement. A codec and filter arrangement 42 is provided for decoding and encoding and filtering PCM data to and from analog signals. The DSP 25 is programmed to connect any desired connection of parties, such as the connection of two of the portable radio stations 3, 4 and 5 to two arbitrary channels, a conference call connection of fixed wired subscribers and portable subscribers or of a local subscriber at the radio base station and fixed wired subscribers and any other suitable or desirable connection between the parties. For an arbitrary connection of the parties Pa and Pb to arbitrary portable radio stations, speech buffer pairs 43 for the parties Pa and Pb are provided in the buffer memory 23. By using a radio frequency slot control table 44 in the channel controller 22, the speech buffer pairs 43 of the parties Pa and Pb can be coupled to any radio channel resource and thus to an arbitrary portable. For an arbitrary connection of the data channel parties Ba and Bb to arbitrary data channels, speech buffer pairs 45 are provided in the buffer memory 23. By using a speech slot control table 46, the data channel buffer pairs 45 of the parties Ba and Bb can be coupled to any suitable data channel. Such a data channel can be a network data channel, or can also be a data channel of an answering device (not shown), or the like. The speech slot control table 46 can be seen as the DSP 25 pointing to desired sources by means of pointers. The parties are connected to each other by means of a mode programmable connection device 47.

FIG. 4 shows a functional diagram F-PP of the first party Pa or Pb in the digital signal processor 25 in the radio base station 2 according to the present invention. The DSP 25 is suitably programmed to carry out the shown functionality. The diagram F-PP shows an ADPCM-to-linear PCM decoder 50 for decoding a 4-bit ADPCM signal at 8 kHz, i.e. at a bit rate of 32 kbit/s, from a portable radio station to a 16 bit linear PCM signal at 8 kHz to be processed by the digital signal processor 25. The ADPCM decoder 50 is coupled to a soft-mute block 51. To encode a linear 16-bit PCM signal at 8 kHz to a 4-bit ADPCM signal to be transmitted to a portable radio station, the diagram F-PP shows a linear PCM-to-ADPCM encoder 52. Further shown is a tone volume control block 53 to operate on portable data, functionally indicated by means of an operation node 54.

FIG. 5 shows a functional diagram F-BB of the second party Ba or Bb in the digital signal processor 25 in the radio base station 2 according to the present invention. The DSP 25 is suitably programmed to carry out the shown functionality. The diagram F-BB shows an 8-bit A-law PCM-to-16-bit linear PCM decoder 60 operating at 8 kHz in the direction from the buffers 45 to the connection device 47, and a 16-bit linear PCM-to-A-law PCM encoder 61 in opposite direction. The decoder branch further comprises a receive volume block 62 and a network echo suppressor 63. The encoder branch further comprises a transmit volume control block 64. A transmit tone volume control block 65 operates on the signal to transmitted at a data channel. From the received data channel an artificial echo is formed by means of the artificial echo block 66. The artificial echo block 66 operates on the signal to be transmitted so as to add a desired echo signal. Tone volume control and artificial echoes operate on respective operation nodes 67 and 68.

FIG. 6 shows a functional diagram F-LOC of the third party Loc in the digital signal processor 25 in the radio base station 2 according to the present invention. The DSP 25 is suitably programmed to carry out the shown functionality. At the side of the connection device 47, a double talk detector 70 is provided coupled to a microphone path MF and a speaker path SP. The microphone path MF comprises a transmit filter 71 for decimation filtering 16-bit linear PCM data at 32 kHz, and a transmit volume control block 72. The speaker path SP comprises a receive filter 73 interpolation filtering linear PCM data at 8 kHz, and operation nodes 74 and 75. A tone volume control block 76 and a side tone signal from a side tone block 77 operate on the respective nodes 74 and 75. A side tone is derived from the microphone path MF.

FIG. 7 shows a functional diagram F-CON for setting up a conference call in the digital signal processor 25 according to the present invention. Shown are operating nodes 80, 81 and 82 suitably interconnected so as to connect three arbitrary parties in a conference call. The diagram F-CON has three inputs Ci1, Ci2 and Ci3, and three outputs Co1, Co2 and Co3.

FIG. 8 shows an example of a connection in the digital signal processor 25 according to the present invention of two portable radio stations and a switched network telephone station in a conference call. Shown is the connection diagram F-CON connecting portable party diagrams F-Pa, F-Pb and F-Ba. The party diagrams F-Pa and F-Pb are identical to the diagram F-PP, and the party diagram F-Ba is identical to the party diagram F-BB. Similarly, any other conference call can be configured by the DSP 25 as controlled by the microcontroller 32.

FIG. 9 shows a codec 90 for use in a local mode in the radio base station 2 according to the present invention. The codec 90 is a device to be coupled between the microphone and speaker paths MF and SP and the microphone and speaker 40 and 41. In the microphone path MF the codec 90 comprises an analog amplifier 91, an analog transmit filter 92, an analog-to-digital converter 93, and a digital decimation filter 94 for digitally filtering a 864 kbit/s bit stream from the A/D-converter 93. In the speaker path SP, the codec comprises a digital noise shaping filter 95, a digital-to-analog converter 96, an analog receive filter 97, and an analog receive amplifier 98.

FIG. 10 shows coupling of the radio base station 2 to the two outgoing lines 7 and 8 of a digital telephony network such as an ISDN network. To this end the IOM™-2 speech interface 34 is coupled to a so-called ISDN $S_0$ bus controller 100.

FIG. 11 shows coupling of the radio base station 2 to the two outgoing lines 7 and 8 of an analog telephony network. To this end an external digital signal processor DSP is provided with appropriate system memory (not shown in detail) of which the respective functional diagrams F-DSP1 and F-DSP2 are given. The diagrams F-DSP1 and F-DSP2 are identical. In the diagram F-DSP1, a receive path RX is coupled to the output DO of the speech interface 34, and a transmit path TX to the input DI of the speech interface 34. The receive path RX comprises an A-law PCM buffer 110 coupled to an A-law PCM-to-linear PCM decoder 111, and further a receive control block 112 and a receive filter 113 coupled to the A/B analog line 7 via a switch 114. The transmit path TX comprises a transmit filter 115 coupled to the A/B analog line 7, and further a local echo canceller 116, a network echo suppressor 117, a transmit volume control block 118, a linear PCM-to-A-law PCM encoder 119, and an A-law PCM buffer 120. The echo canceller 116 and the echo suppressor 117 are also coupled to the receive path RX. A side tone block 121 is coupled between a DTMF generator 122 operating at 32 kHz and an operation node 123 at an input of the A-law encoder 119 in the transmit path TX. The microcontroller 32 is a master controller in the radio base station 2, whereas the external digital signal processor DSP is a slave. Accordingly, the microcontroller 32 controls and programs the external digital signal processor DSP such that the a correct operation on the time division IOM™-signals is achieved, i.e. the functional blocks F-DSP1 and F-DSP2 alternately operate on successive IOM™-2 time slots.

FIG. 12 shows a parameter table PAR for the digital signal processor 25 in the radio base station 2 according to the present invention. The parameter table PAR is stored in the buffer memory 23. The microcontroller 32 updates and downloads the parameter table PAR at an external stimulus signal, i.e. the microcontroller becomes aware of the desired connection from external signals and then starts an update cycle. The table PAR comprises DSP parameters DSP-PAR at given address locations ADDR, and contains pointers for the parties Pa, Pb, Ba, and Bb for instance so that the right data connections can be made for a given connection. Other parameters determine side tone control, transmit volume, and so on and are not shown in detail here. Shown are pointers Pa-ADPCM, Pb-ADPCM, Ba-A-law, and Bb-A-law, and further a parameter program mode PROG. With the parameter PROG, the DSP 25 configures the desired connection. The pointers Pa-ADPCM, Pb-ADPCM, Ba-A-law, and Bb-A-law point to desired buffer locations in the buffer memory 23 for data exchange between the channel controller 22 and the DSP 25, and for data exchange between the DSP 25 and the network lines 7 and 8.

We claim:

1. A digital cordless telephony system comprising a radio base station and a plurality of portable radio stations for communicating with the radio base station, in which system the radio base station is arranged to be coupled to a switched telephony network and comprises a multi-channel radio front-end, a channel controller, a buffer memory for buffering received and transmitted data, and a digital signal processor for data format converting the received and transmitted data, the buffer being coupled to the channel controller and the digital signal processor, characterized in that the digital signal processor is configured as a mode programmable connection device to operate the radio base station in different connection modes for connecting different parties to each other including a selection from connections comprising a connection of a portable radio station as a first party to the switched telephony network as a second party, a connection of the first party to a wired telephony arrangement as a third party, and a connection of at least three of the parties in a conference call, and that the digital signal processor is programmed to switch from one connection mode to another connection mode at an external stimulus signal, the digital signal processor further being programmed to support digital signal processing functionalities of the parties in correspondence with a selected connection mode.

2. A digital cordless telephony system according to claim 1, wherein the digital cordless telephony system is a frequency and time division multiple access system in which at an air interface the portable radio stations are arranged to communicate with the radio base station in timeslots of a radio carrier, and that the channel controller is arranged to switch data bursts to and from the buffer memory in a timeslot.

3. A digital cordless telephony system according to claim 2, wherein at a network side the digital signal processor is arranged to exchange data according to standard ISDN-interface so as to support at least two outgoing lines, the digital signal processor further being arranged to an arbitrary internal data channel to the lines.

4. A digital cordless telephony system according to claim 3, wherein a functionality of the first party includes ADPCM-decoding and ADPCM-encoding means for respective decoding of 4-bit ADPCM data received from the air interface to 16-bit linear PCM data, and encoding of 16-bit linear PCM data to 4-bit ADPCM data to be transmitted via the air interface.

5. A digital cordless telephony system according to claim 4, wherein a functionality of the second party includes A-law or $\mu$-law decoding and A-law or $\mu$-law encoding means for respective decoding of 8-bit A-law or $\mu$-law PCM data from the network to 16-bit linear PCM data, and encoding 16-bit linear PCM data to 8-bit A-law or $\mu$-law PCM data to be transmitted to the network.

6. A digital cordless telephony system according to claim 5, wherein the network is an analog network, and the radio base station comprises a further digital signal processor which is programmed to support echo cancelling of at least two network lines and to support respective decoding of A-law or $\mu$-law PCM data to an analog signal to be transmitted to the network, and encoding of an analog signal to A-law or $\mu$-law PCM data received from the network.

7. A digital cordless telephony system according to claim 3, wherein the network is an ISDN-network.

8. A digital cordless telephony system according to claim 1, wherein the digital signal processor is programmed to connect parties on the basis of buffer pointers for pointing at appropriate data buffer for data exchange between parties.

9. A digital cordless telephony system according to claim 8, wherein the buffer memory comprises an first buffer memory outside the digital signal processor and a second buffer memory inside the digital signal processor, the buffer pointers coupling appropriate buffer locations in the memories in accordance with a selected operating mode.

10. A digital cordless telephony system according to claim 1 to 9, wherein the radio base station comprises a microcontroller for controlling the digital signal processor and for loading mode control parameters in the digital signal processor.

11. A digital cordless telephony system according to claim 1 wherein the digital signal processor supports two first parties, two second parties, and one third party.

12. A radio base station for use in a digital cordless telephony system in which a plurality of portable radio stations is arranged to communicate with the radio base station, and in which the radio base station is arranged to be coupled to a switched telephony network, the radio base station comprising a multi-channel radio front-end, a channel controller, a buffer memory for buffering received and transmitted data, and a digital signal processor for data format converting the received and transmitted data, the buffer being coupled to the channel controller and the digital signal processor, characterized in that the digital signal processor is configured as a mode programmable connection device to operate the radio base station in different connection modes for connecting different parties to each other including a selection from connections comprising a connection of a portable radio station as a first party to the switched telephony network as a second party, a connection of the first party to a wired telephony arrangement as a third party, and a connection of at least three of the parties in a conference call, and that the digital signal processor is programmed to switch from one connection mode to another connection mode at an external stimulus signal, the digital signal processor further being programmed to support digital signal processing functionalities of the parties in correspondence with a selected connection mode.

13. A cordless telephony set comprising a radio base station according to claim 12; and a cordless handset.

14. A radio base station for use in a digital cordless telephony system in which a plurality of portable radio stations can communicate with the radio base station, and in which the radio base station can be coupled to a switched telephony network, the radio base station comprising:

a multi-channel radio front-end transceiver for transmitting first data and receiving second data, a buffer memory for buffering the second and the first data, and a digital signal processor which is configured as a mode programmable connection device to operate the radio base station in different connection modes for connecting different parties to each other, the digital signal processor being programmed to switch from one connection mode to another connection mode in response to an external stimulus signal, and to support digital signal processing functionalities of the different parties in correspondence with a selected connection mode from a selection of connections comprising a connection of a portable radio station as a first party to the switched telephony network as a second party, a connection of the first party to a wired telephony arrangement as a third party, and a connection of at least three of the parties in a conference call.

15. A cordless telephony set comprising; the radio base station of claim 14; and a cordless telephony handset for use with the radio base station.

* * * * *